United States Patent [19]
Schäfer et al.

[11] Patent Number: 5,470,204
[45] Date of Patent: Nov. 28, 1995

[54] HYDRAULIC ADJUSTMENT DEVICE

[75] Inventors: Horst Schäfer, Rhade; Günter Schaaf, Bremen; Bernhard Scholz, Bremen; Günter Beiss, Bremen, all of Germany

[73] Assignee: KSB Aktiengesellschaft, Frankenthal, Germany

[21] Appl. No.: 200,238

[22] Filed: Feb. 23, 1994

[30] Foreign Application Priority Data

Feb. 27, 1993 [DE] Germany .......................... 43 06 133.8

[51] Int. Cl.⁶ ............................................. F04D 29/06
[52] U.S. Cl. .................................................. 416/157 R
[58] Field of Search .................. 415/129; 416/156, 416/157 R, 157 A, 159

[56] References Cited

U.S. PATENT DOCUMENTS

| | | | |
|---|---|---|---|
| 345,132 | 5/1943 | Florian et al. | 416/160 |
| 3,006,419 | 10/1961 | Klaassen et al. | 416/157 R |
| 3,924,411 | 12/1975 | May | 416/157 R |
| 4,668,168 | 5/1987 | Schilder et al. | 416/157 R |

FOREIGN PATENT DOCUMENTS

| | | |
|---|---|---|
| 694029 | 7/1940 | Germany . |
| 697416 | 10/1940 | Germany . |
| 2250473 | 10/1972 | Germany . |
| 0417850 | 2/1947 | Italy .................................. 416/157 |

OTHER PUBLICATIONS

Storek, H.: Neuere Konstrucktfonen kleinerer und mittelgroler Kaplanturbinen. In: Engergie, Jg. 5, Nr. 8 15. Aug. 1953, S.232–234.

Primary Examiner—Edward K. Look
Assistant Examiner—Mark Sgantzos
Attorney, Agent, or Firm—Darby & Darby

[57] ABSTRACT

The invention relates to a turbo-engine with a hydraulic device for adjusting the blades of a variable-pitch propeller. A hydraulic pump for hydraulically adjusting the blades of the variable-pitch propeller is disposed within a chamber through which passes the shaft of the turbo-engine. This chamber is filled with an incompressible fluid, for example an oil receiver for lubricating bearings.

11 Claims, 4 Drawing Sheets

1

HYDRAULIC ADJUSTMENT DEVICE

FIELD OF THE INVENTION

The present invention relates to an adjustment device for adjusting the blade of a variable pitch propeller.

BACKGROUND OF THE INVENTION

Propeller pumps with axially and semi-axially arranged propeller blades are preferably used, for example, to transport large quantities of water to small or medium heights. These pumps are used for surface drainage, in sewage systems, high-water pumping stations, and the like. These applications frequently present the problem of accounting for varying or different intake quantities and intake heights. The same holds true for turbine units Used to generate power. Variable-pitch propellers are used so that the turbo-engine can be operated under these different conditions in the range of its maximum efficiency. The individual blades can thus be adjusted during operation in dependence on the intake conditions. The adjustment mechanism for the variable-pitch propellers is driven directly or indirectly by an electric motor or by a hydraulic system. Adjustment mechanisms to vary the blades are known for the variable-pitch propellers themselves.

The German reference DE-PS 694 029 discloses an adjustment device of this type. The adjustment device includes a shaft with a variable-pitch propeller fastened thereon, hydraulic transmission elements within the shaft, and a transmission dement for feeding hydraulic fluid into the shaft. The high-energy hydraulic fluid is supplied from an external source. The hydraulic fluid acts on an adjustment mechanism, here designated as a motor, within the propeller. The feeding transmission element is a disadvantage of this solution, since leaks can cause hydraulic fluid to reach the environment.

SUMMARY OF THE INVENTION

The present invention overcomes the aforementioned problems by providing a reliable drive mechanism for a hydraulically activated variable-pitch propeller, which is inexpensive to construct and which can be used for large adjustment torques.

By disposing the hydraulic pump within the chamber that is fried with hydraulic fluid, generally an oil to lubricate the shaft beatings and/or the inner floating ting seals, the hydraulic fluid can be transmitted into the shaft simply and safely. Since this chamber is in any case sealed hermetically against the environment, a possible leakage of hydraulic fluid between the shaft and the transmission system creates no hazard to the environment. The hydraulic pump, whose construction type is not restricted in any way, suctions hydraulic fluid from the chamber containing it. Thus, the hydraulic fluid only needs to be supplied to the variable-pitch propeller in a conventional fashion. The hydraulic fluid is then transported back into the chamber through the transmission elements in the shaft.

A modification of the present invention provides that the hydraulic pump is disposed next to the shaft and is driven by the shaft through mechanical transmission elements. This embodiment offers the advantage that the shaft need not have a specific design and that a conventional hydraulic pump merely feeds its product into the shaft. The driving forces are transmitted from the shaft to the pump by conventional transmission devices. However, it is preferred that this solution be only used in systems where it is intended to adjust the propeller only during operation.

If adjustment at rest is desired, another modification provides for the hydraulic pump to be disposed next to the shaft and to be driven by an electric motor.

In this connection, another solution provides for the hydraulic pump to be disposed within the shaft or within a shaft part and thus to rotate with the shaft. For example, a flange of the shaft can be hollow, so as to provide space to accommodate the hydraulic pump.

Another modification of the present invention provides that a gear transmission, disposed between the motor or generator, drives the hydraulic pump. Such a solution is conceivable, for instance, in connection with submersible motor-driven pumps, in which a fast motor must drive a slow variable-pitch propeller. In the inverse case, this can naturally also be the case with appropriately designed turbines. The differences in rotational speed are then convened by a gear mechanism, which simultaneously drives the hydraulic pump. The different rpms between the driving shaft and the power take-off shaft is used here as the driving rpm for the hydraulic pump. This solution is suited for systems in which adjustment of the propeller is intended only during operation.

For systems in which adjustment of the propeller is anticipated during operation, another modification of the present invention provides that a servomotor, disposed at the motor or generator and penetrating the shaft or shaft parts with a simple or multiple transmission element, drives the hydraulic pump. This electric motor would then be disposed on a motor or generator side and would penetrate its motor or generator shaft with a simple or multiple transmission element, so as to drive the hydraulic pump. Depending on the construction type of the hydraulic pump, the transmission element can be a rotating or a longitudinally moving structural part.

Another solution of the present invention again provides for a hydraulic pump with an intermittent mode of operation. Depending on the adjustment mechanism being used within the variable-pitch propeller, it is possible, for example, by brief pressure surges or by so-called pumping operation, to bring the blades into the particular desired position in small adjustment steps.

This solution is advantageous in connection with compact immersion units, especially submersible motor-driven pump units, since an oil receiving chamber for accommodating the axial bearings and/or the radial bearings as well as the floating ring seals and oil for lubricating these are generally present. No additional rotary feeds are necessary with respect to the medium being transported, and only small forces are exerted on the rotating parts while the blades are being adjusted or regulated. The fact that no adjustment forces act on the rotating parts except during the adjustment or regulation times is a significant advantage. If leakages within the hydraulic system should occur nevertheless, for example in the area of the rotary leads, they will in no way affect the remaining pump or turbine parts and cannot cause damage to or failure of other functional groups. Since the leads of the hydraulic pump are disposed in a chamber filled with oil, a possible leakage represents only a backflow into the supply container. Various solutions can be used to transmit the hydraulic forces to the adjustment mechanism within the variable-pitch propeller.

Further modifications of the present invention provide for an electro-mechanical and/or electro-thermal functional principle for driving the hydraulic pump as well as mechanically and/or electro-mechanically activated switching elements to control the hydraulic fluid. It is thus possible to use low-friction and energy-saving elements.

Another essential advantage of this solution includes the fact that no additional webs, fibs, gaskets, beatings, or other structural parts for supplying power are needed in the area of the variable-pitch propeller. Since these parts are directly exposed to the flow medium, there is always a risk that the structural part itself will affect the flow cross-section and that the flow cross-section can be constricted by additional contamination, which can reach the area of the variable-pitch propeller together with the transported medium. There is also a risk of contaminating the transport medium if there should be a leakage.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein.

DETAILED DESCRIPTION OF THE PRESENTLY PREFERRED EMBODIMENTS

Figure 1:
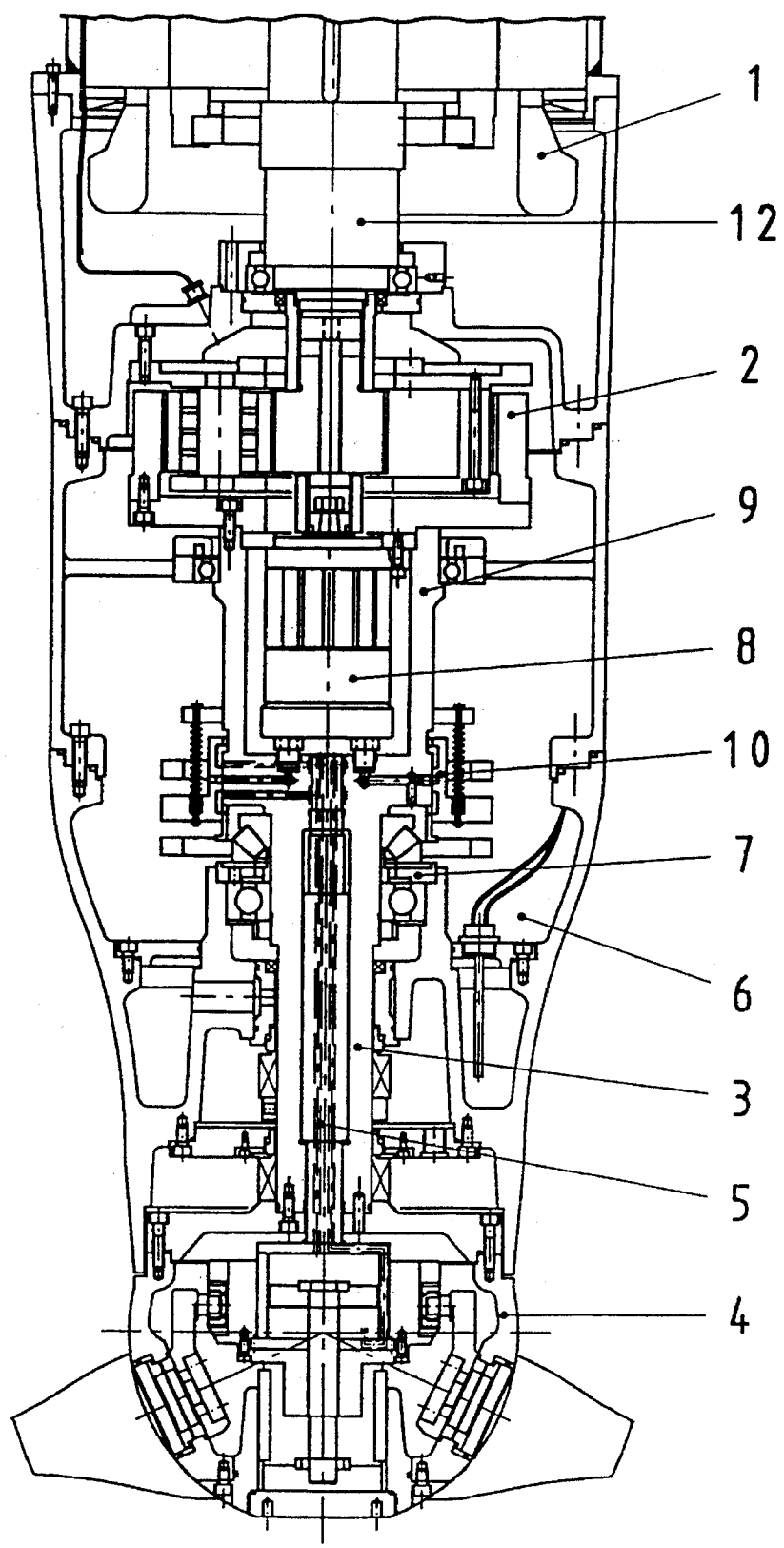
FIG. 1 shows a hydraulic pump disposed in a shaft.

Referring now to FIG. 1, a turbo-engine and a submersible motor-driven pump are illustrated. The device includes a motor 1, whose rotational speed is influenced by a subsequent gear transmission 2. The illustrated example includes a step-down transmission, which is not necessary for all types of turbo-engines. The gear transmission acts on a shaft 3, which is equipped with a variable-pitch propeller 4. Transmission elements 5, for hydraulic fluid, are disposed within the shaft 3. Shaft 3 passes through a chamber 6, which is filled with hydraulic fluid, with a bearing 7 disposed therein. The hydraulic fluid can be oil, water, or other types of incompressible fluids, depending on the type of bearing 7. A hydraulic pump 8 is disposed in a hollow flange part 9 of the shaft 3 and the pump 8 rotates with the shaft rpm. The different rpm of the gear transmission 2 are used to drive the hydraulic pump 8. Hydraulic pump 8 suctions directly from chamber 6 and pumps into the transmission elements 5. While the hydraulic pump is operating during an adjustment process, there is little load on the system. To control the hydraulic system, switching elements 10, designed as a gate control, are disposed on the shaft 3 or on its flange part 9. Switching elements 10 can be activated easily by electromagnetic means. To the left, as viewed in FIG. 1, two different positions of the switching element 10 are also shown as a cutout. It is thus possible to influence the hydraulic fluid very simply during an adjustment process.

Figure 2:
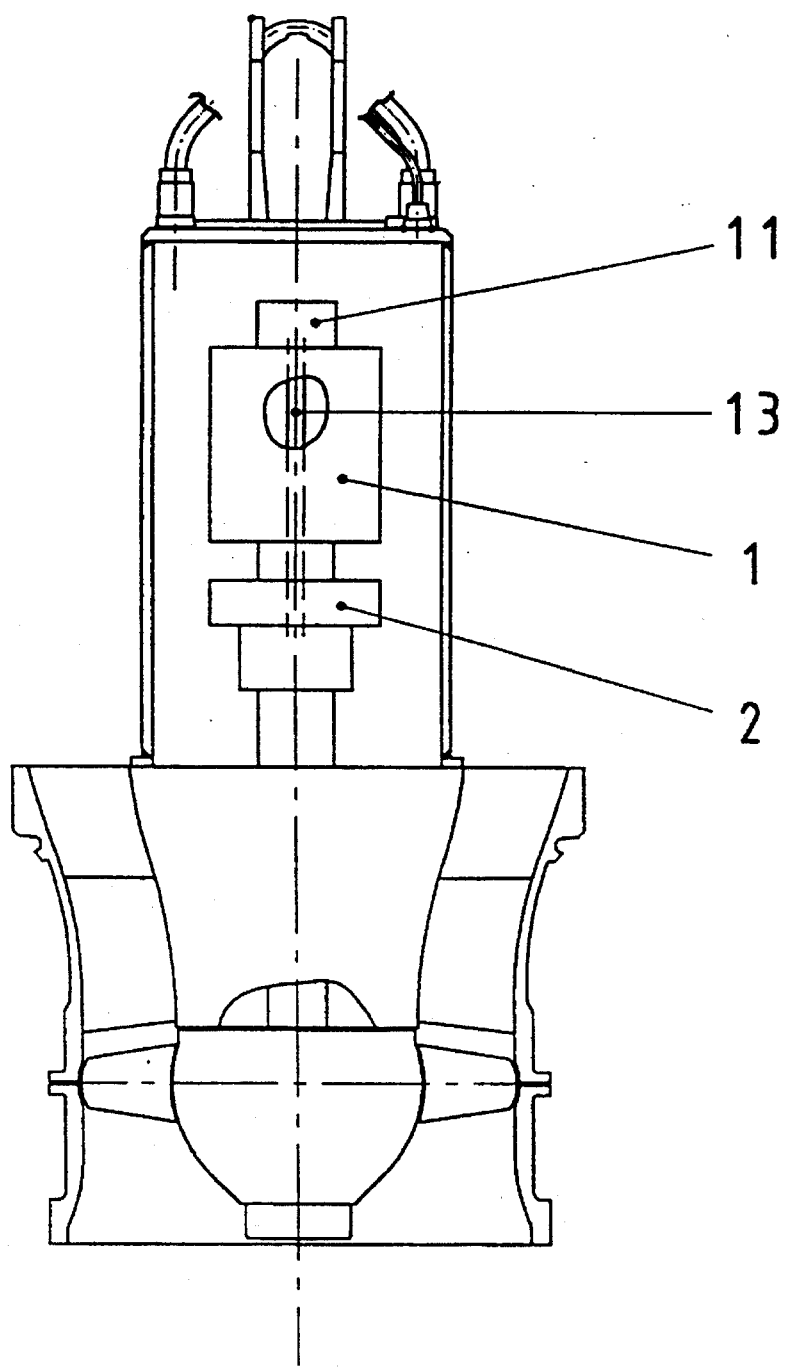
FIG. 2 shows a drive for the hydraulic pump through an electric motor.

FIG. 2 schematically shows an embodiment in which a hydraulic pump 8, disposed according to FIG. 1, is driven by a separate servomotor 11. For this purpose, the shaft 12 of the motor or generator 1 has a bore within it which is disposed as a structural part 13 for transmitting the force. This part can be a rotating shaft or an axially movable push rod depending upon the type of hydraulic pump and servomotor that is used in the particular application. What holds in principle for all types of designs is that the use of a gear transmission 2 is optional, and depends on the types of motors or generators in the particular application.

Figure 3:
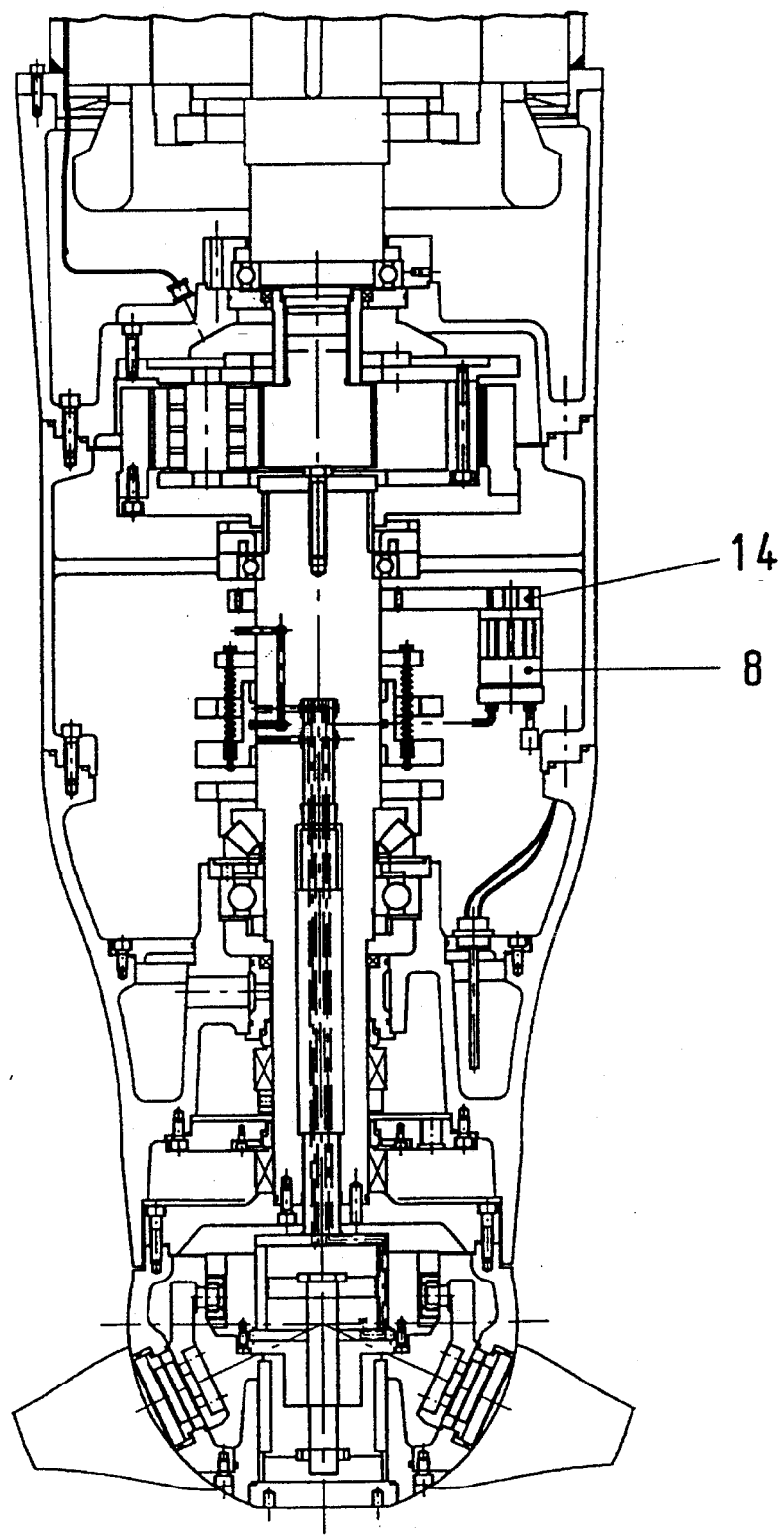
FIG. 3 shows a hydraulic pump disposed next to the shaft.
Figure 4:
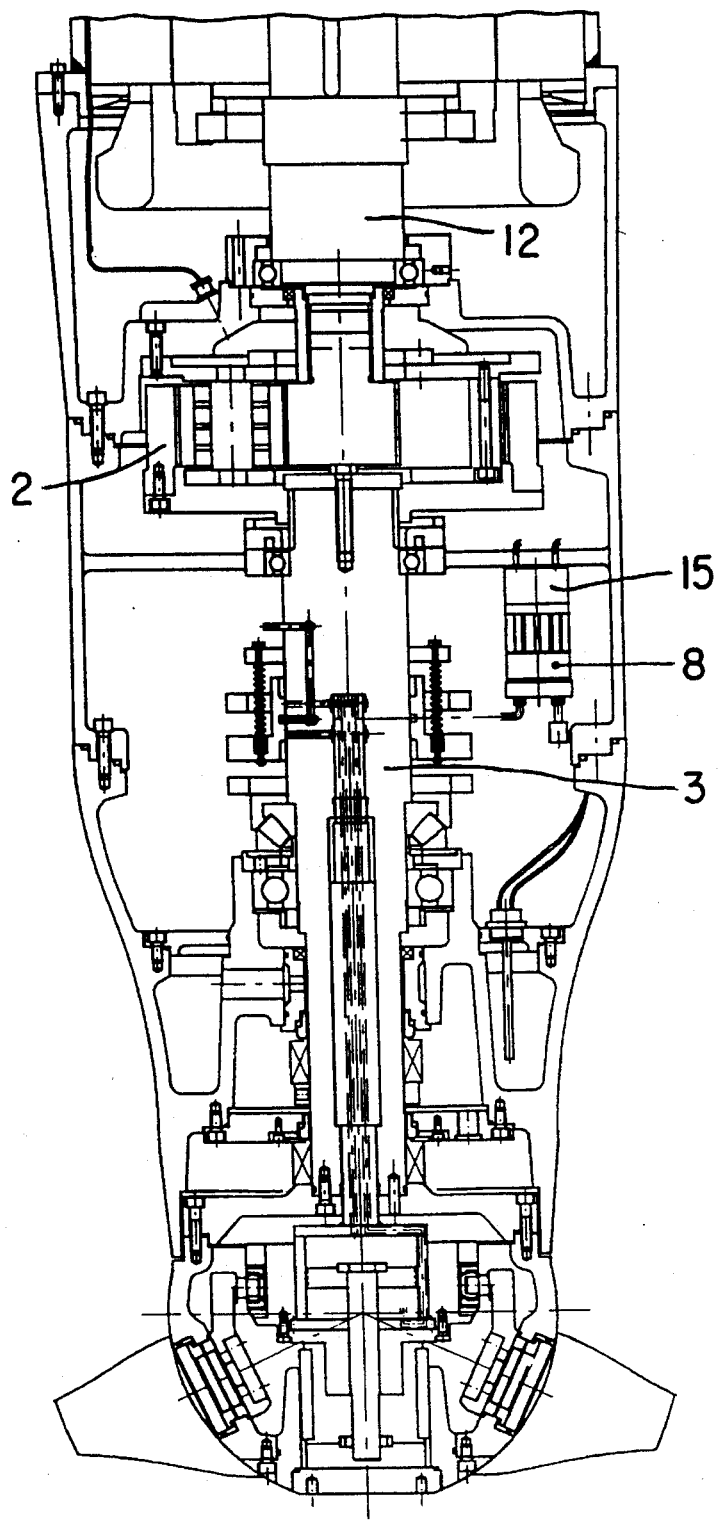
FIG. 4 shows, a hydraulic pump, similar to FIG. 3, but being driven by an electric motor.

FIG. 3 shows a variation of the present invention in which the hydraulic pump 8 is disposed next to the shaft 3. The hydraulic pump 8 can be driven here from the shaft 3 through transmission elements 14. Conventional means for force transmission can be used as the transmission elements 14. Of course, it is also possible to have the hydraulic pump 8 driven directly by an electric motor 15, as illustrated in FIG. 4, or by a servomotor that is likewise situated in the chamber 6. This offers the possibility of adjusting the blades even while the turbo-engine is at rest. It would then only be necessary to introduce an easily sealed electric supply line into the chamber 6.

An advantage of the present invention is that the hydraulic adjustment device is disposed within the chamber which is filled with hydraulic fluid in any case and which is sealed against the environment. Additional seals, which always entail a risk of breakdown, are not required by the present invention.

The hydraulic pump can also be disposed at another face side of the motor or generator. In that case, the hydraulic fluid would then also be transferred through the shaft of the motor or generator.

From the foregoing description, it will be appreciated that the present invention makes available, a compact, cost efficient and reliable drive mechanism for a hydraulicly actuated variable pitch propeller, which can be used for large adjustment torques.

Having described the presently preferred exemplary embodiment of a new and improved drive mechanism in accordance with the present invention, it is believed that other modifications, variations and changes will be suggested to those skilled in the art in view of the teachings set forth herein, It is, therefore, to be understood that all such variations, modifications, and changes are believed to fall within the scope of the present invention as defined by the appended claims.

What is claimed is:

1. An hydraulic actuation system for controlling the pitch angle of blades of a variable-pitch fluid propeller comprising:

a rotatable shaft:

at least one variable-pitch blade being pivotally attached to said rotatable shaft, said at least one blade having a pitch angle and being pivotally rotated by an actuator;

at least one fluid passageway being located axially within said rotatable shaft for transmitting hydraulic fluid;

means for activating said actuator in response to hydraulic fluid pressure, said activating means being in fluid communication with said fluid passageway;

a sealed chamber disposed about said shaft, said sealed chamber being in fluid communication with said at least one fluid passageway;

an hydraulic pump being located within said sealed chamber; and means for driving said hydraulic pump so that said hydraulic pump selectively forces hydraulic fluid through said at least one fluid passageway between said chamber and said activating means to control the pitch angle of said at least one blade.

2. The hydraulic actuation system according to claim 1, wherein said hydraulic pump is located adjacent to said rotatable shaft and said driving means is derived from the rotation of said rotatable shaft.

3. The hydraulic actuation system according to claim 1, wherein said hydraulic pump is located adjacent to said rotatable shaft and said driving means is derived from an electric motor.

4. The hydraulic actuation system according to claim 1, wherein said hydraulic pump is located within said rotatable shaft and rotates with said rotatable shaft.

5. The hydraulic actuation system according to claim 4, further comprising a gear transmission assembly located adjacent to said hydraulic pump along said shaft, wherein said driving means is provided by said gear transmission assembly.

6. The hydraulic actuation system according to claim 4, further comprising an electric motor located adjacent to said hydraulic pump, wherein said driving means is provided by said electric motor, said electric motor connected to said hydraulic pump by a transmission coupling element.

7. The hydraulic actuation system according to claim 6, wherein said electric motor is a servo-motor.

8. The hydraulic actuation system according to claim 1, wherein an activation of said driving means is intermittent.

9. The hydraulic actuation system according to claim 8, further comprising switching elements to control the flow of hydraulic fluid in said at least one fluid passageway.

10. An hydraulic actuation system for controlling the pitch angle of blades of a variable-pitch fluid propeller comprising:

a rotatable shaft:

at least one variable-pitch blade being pivotally attached to said rotatable shaft, said at least one blade having a pitch angle and being pivotally rotated by an actuator;

at least one fluid passageway being located axially within said rotatable shaft for transmitting hydraulic fluid;

means for activating said actuator in response to hydraulic fluid pressure, said activating means being in fluid communication with said fluid passageway;

a sealed chamber being disposed about said shaft, said sealed chamber being in fluid communication with said at least one fluid passageway;

an hydraulic pump located within said sealed chamber and within said rotatable shaft so that said hydraulic pump rotates with said rotatable shaft;

a gear transmission assembly located adjacent to said hydraulic pump along said shaft, said gear transmission assembly driving said hydraulic pump so that said hydraulic pump selectively forces hydraulic fluid through said at least one fluid passageway between said chamber and said activating means to control the pitch angle of said at least one blade.

11. An hydraulic actuation system for controlling the pitch angle of blades of a variable-pitch fluid propeller comprising:

a rotatable shaft:

at least one variable-pitch blade being pivotally attached to said rotatable shaft, said at least one blade having a pitch angel and being pivotally rotated by an actuator;

at least one fluid passageway being located axially within said rotatable shaft for transmitting hydraulic fluid;

means for activating said actuator in response to hydraulic fluid pressure, said activating means being in fluid communication with said fluid passageway;

a sealed chamber being disposed about said shaft, said sealed chamber being in fluid communication with said at least one fluid passageway;

an hydraulic pump being located within said sealed chamber and within said rotatable shaft so that said hydraulic pump rotates with said rotatable shaft;

an electric motor being located adjacent said hydraulic pump, said electric motor connected to said hydraulic pump by a transmission coupling element, said electric motor drives said hydraulic pump so that said hydraulic pump selectively forces hydraulic fluid through said at least one fluid passageway between said chamber and said activating means to control the pitch angle of said at least one blade.

\* \* \* \* \*